United States Patent [19]

Pauwels

[11] 3,769,533

[45] Oct. 30, 1973

[54] ADAPTIVE BRAKING WHEEL SPEED SENSOR

[75] Inventor: Edward M. Pauwels, South Bend, Ind.

[73] Assignee: The Bendix Corporation, South Bend, Ind.

[22] Filed: May 22, 1972

[21] Appl. No.: 255,706

[52] U.S. Cl.................... 310/155, 310/168, 74/711
[51] Int. Cl. .......................................... H02k 21/38
[58] Field of Search ......................... 310/168–170, 155, 154, 1, 75, 68, 67; 74/711

[56] References Cited
UNITED STATES PATENTS

| 3,504,538 | 4/1970 | Andrews et al................. 310/168 X |
| 3,138,970 | 6/1964 | Costa et al............................ 74/711 |
| 2,853,638 | 9/1958 | Bonnano et al.............. 310/155 UX |

Primary Examiner—D. F. Duggan
Attorney—Ken C. Decker et al.

[57] ABSTRACT

An electromagnetic probe is installed in the differential housing of an automotive vehicle. The probe includes a substantially U-shaped core piece having a base which abuts a permanent magnet and pair of generally parallel arms which extend through the centers of a pair of coils. The arms extend into close poximity with circumferentially spaced teeth formed on the differential frame and on one of the axles. Since rotation of the teeth past the legs changes the reluctance path of the magnet, a pulsed output will be generated in the coils, the frequency of which varies directly according to the speed of rotation of the frame and of the axle. Since the frame rotates at substantially the same speed as the vehicle drive shaft or at some known fraction of that speed, and since the drive shaft rotates at the average speed of the left and right axles, by determining the speed of rotation of the frame and of one of the axles, the speed of rotation of the other axle may be readily determined, thereby providing intelligence of the speed of rotation of both of the vehicle's rear axles by using only the single probe. This speed sensor is particularly useful in automotive adaptive braking systems.

5 Claims, 1 Drawing Figure

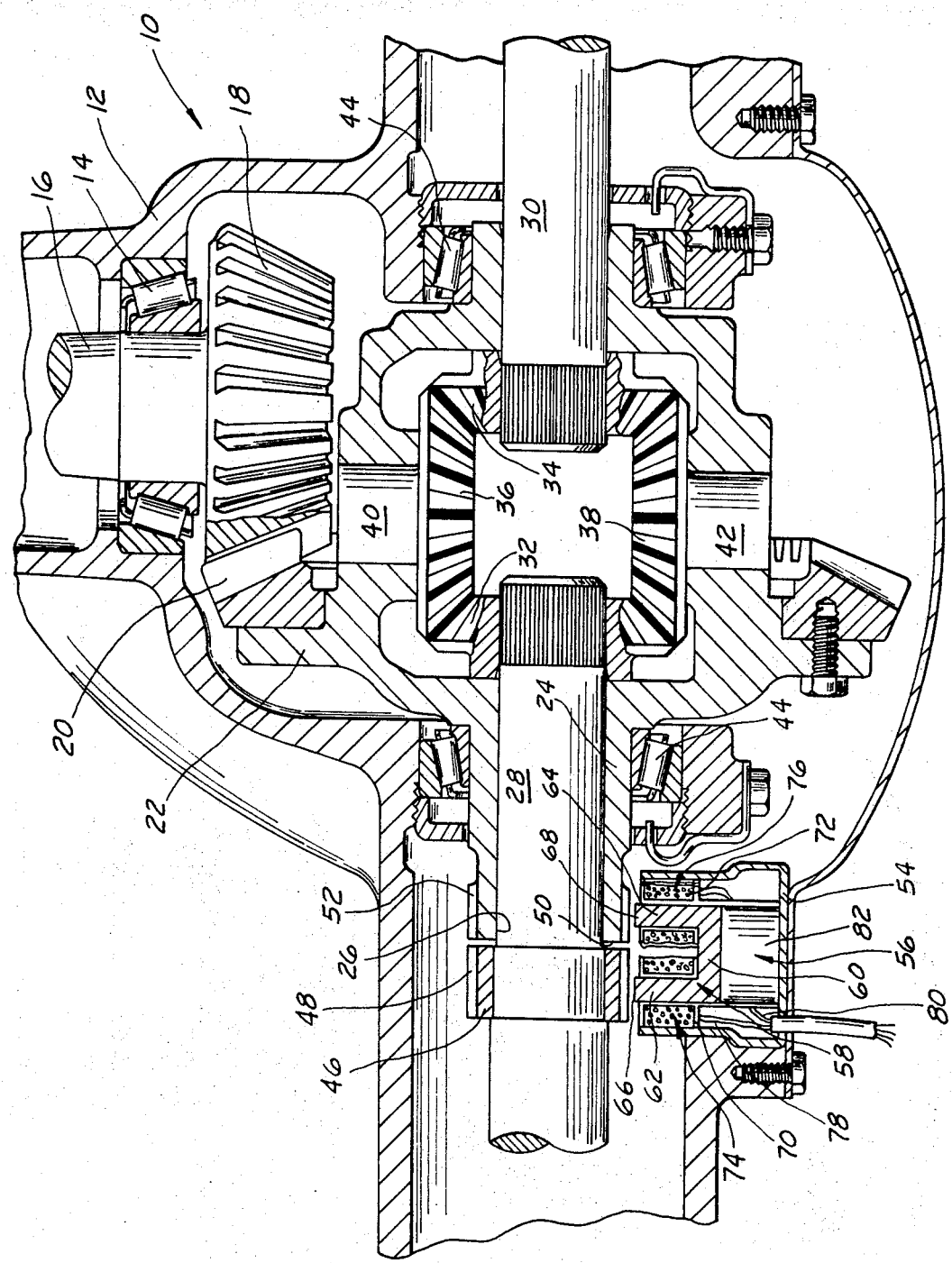

ADAPTIVE BRAKING WHEEL SPEED SENSOR

BACKGROUND OF THE INVENTION

This invention relates to a differential speed sensor for use with an automotive adaptive braking system.

The logic controller in an automotive adaptive braking sytstem which actuates a modulator to relieve braking pressure when an incipient skidding condition exists and requires intelligence of the speed of at least the rear wheels of the vehicle. Existing adaptive braking systems use sensors mounted in the rear wheels themselves. However, these speed sensors have been rather expensive and troublesome to manufacture, since axle deflections, and other inaccuracies in the wheel and axle, have precluded use of a simple speed sensor system and have instead compelled a rather complicated friction drive mechanism. These systems have proven to be extremely costly, particularly in view of the fact that entirely separate sensors are required for each of the rear wheels. The potential solution for this cost problem has been to sense the speed of the vehicle drive shaft. However, the drive shaft speed is the average of the speed of the two rear wheels, and by itself does not provide sufficient intelligence to effect acceptable adaptive braking control.

SUMMARY OF THE INVENTION

Therefore, an important object of my invention is to provide a simple, inexpensive wheel speed sensor mechanism for an automotive adaptive braking system which may also be manufactured and installed on the vehicle at a minimum cost.

Another important object of my invention is to provide a speed sensor mechanism which may be mounted in the differential of the vehicle.

Still another important object of my invention is to provide a speed sensor mechanism which is capable of sensing the speed of both of the rear wheels of the vehicle, but which utilizes only a single, relatively simple probe.

A still further object of my invention is to provide a wheel speed sensor which is mounted in the vehicle differential and which requires only minimum alteration of the differential mechanism.

DESCRIPTION OF THE DRAWINGS

The sole FIGURE of the drawing is a cross-sectional view of a conventional automotive differential mechanism having a sensor mechanism made pursuant to the teachings of my present invention mounted therein.

DETAILED DESCRIPTION

Referring now to the drawings, a vehicle differential mechanism 10 is illustrated which is identical to the conventional differential mechanism which is used on virtually every automotive vehicle manufactured in the United States and whose design and function is well known to all of those skilled in the automotive art. The differential mechanism 10 includes a housing 12 which is usually mounted near the rear of the vehicle body. Mechanism 10 includes a bearing 14 which rotatably supports one end of the vehicle's drive shaft 16. The other end of the drive shaft 16 is received within the vehicle's transmission mechanism which is turned by the engine of the vehicle. A drive pinion 18 is mounted on the end of the drive shaft 16 and meshes with a ring gear 20 which is carried by the differential frame 22.

The differential frame 22 includes an annular portion 24 which defines a bore 26 therewithin which extends through the differential frame 22. A left axle 28 and a right axle 30 are received within the bore 26 and supported for rotation with respect thereto. One end of the axle 28 is connected to the left rear wheel of the vehicle, and an axle pinion 32 is secured to the other end of the axle 28. One end of the axle 30 is connected to the right rear wheel of the vehicle, and an axle pinion 34 is carried by the other end of the latter. Both of the axle pinions 32 and 34 mesh with planet pinions 36, 38 which are carried by shafts 40 and 42 respectively which rotatably mount the planet pinions 36 and 38 on the differential frame 22. Of course, the planet pinions 36 and 38 also rotate with the differential frame 22 when it is rotated by the drive pinion 18. Bearings 44 are provided to rotatably support the frame 22, and therefore the axles 28 and 30, in the housing 12.

A toothed ring 46, having circumferentially spaced gear teeth 48 formed on the outer circumferential surface thereof, is secured to the axle 28 adjacent the left hand end 50 of the housing 24. Similar circumferentially spaced teeth 52 are formed on the outer circumferential surface of the housing 24 adjacent the end 50 thereof. A probe housing 54 is installed in the differential housing 12 adjacent the end 50 of the housing 24, and mounts an electro-magnetic pick-up device generally indicated by the numeral 56 on the housing 12. The electro-magnetic pickup 56 includes a generally U-shaped core member 58, which is preferably made of magnetic iron and which includes a base portion 60 from which legs 62 and 64 extend. The outer ends 66 and 68 of the legs 62 and 64 extend into very close proximity with the outer circumferential edges of the teeth 48 and 52, respectively. Each of the legs 62, 64 receives an annular spool 70, 72. An electrical conductor is wrapped around the spools 70 and 72 to form electro-magnetic coils 74 and 76. Leads 78, 80 connect the coils 74, 76, respectively, with a logic controller (not shown) which is the electronic "brain" of the adaptive braking system. A single permanent magnet 82 is carried within the housing 54 in engagement with the base 60 of the core piece 58. Of course, a pair of sensors having cylindrical core pieces may be used in lieu of the single sensor having a U-shaped core piece.

MODE OF OPERATION

As was discussed hereinabove, the structure of the differential mechanism itself is completely conventional, being used in virtually every vehicle now manufactured in the United States. Therefore, the operation of the differential mechanism itself will not be described in detail. As is well known to those skilled in the art, because of the engagement of the drive pinion 18 and the ring gear 20, the frame 22 rotates at substantially the same speed as the drive shaft 16 or at some known fraction of that speed. Similarly, because of the construction of the pinions 32, 34, 36, and 38, the speed of rotation of the frame 22 is also the average of the speed of the shafts 28 and 30.

The reluctance of the magnetic path between the magnet 82 through the ring 46 is constantly varying as the shaft 28 rotates. The reluctance of the path will vary depending on whether one of the circumferentially spaced teeth 48 or one of the intermediate spaces (not shown) are disposed directly opposite the end 66 of leg 62 of core piece 58. Because of this constantly changing reluctance, a pulsed electrical output is generated in the coil 74, the frequency of which is proportional to the speed of rotation of the shaft 28. Rotation of the frame 22 induces an output signal in the coil 76, the frequency of which varies proportionally to the speed of rotation of the frame 22. Therefore, signals are available to the aforementioned logic controller which are proportional to the speed of rotation of axle 28 and of the frame 22. Since it is known that the frame 22 rotates at the average of the speed of the axles 28 and 30 or, $D = (L + R)/2$ where $D$ equals the speed of the frame, $L$ equals the speed of the left axle, $R$ equals the speed of the right axle, and therefore $R$ equals $2D - L$. Since both $D$ and $L$ are known quantities, the speed R may be easily calculated in the electronic controller.

I claim:

1. In a vehicle having a drive shaft and a pair of axles, means rotatably carried on said vehicle for drivingly interconnecting said drive shaft with each of said axles, said interconnecting means including a housing, a frame within said housing, means for supporting said frame for rotation relative to the vehicle, means drivingly interconnecting said frame with said drive shaft, said frame defining a bore therewithin, each of said axles being rotatably received within said bore and extending from opposite ends of the latter, said axles being supported in said bore for rotation with respect to said frame, means drivably interconnecting said frame and each of the axles whereby the speed of rotation of each of said axles bears a predetermined relationship with the rotational speed of said frame and the rotational speed of the other axle, whereby the rotational speed of the other axle may be determined if the rotational speed of one of the axles and the frame are determined, and means for generating signals proportional to the rotational speed of said frame and of one of said axles, said generating means including probe means for generating output signals proportional to the rotational speed of said frame and of said one axle, and means mounting said probe means on said housing adjacent the point where said one axle extends from said bore.

2. The invention of claim 1:
said one axle having a first set of circumferentially spaced teeth provided thereon, said teeth being located adjacent the point where said one axle extends from said bore;
said frame including an annular portion defining said bore therewithin, a second set of circumferentially spaced teeth provided on the outer circumferential surface of the annular portion of the frame adjacent the point where said one axle extends from said bore;
said housing having a single opening defined therein exposing said point where said one axle extends from said bore, said probe means being retained within said single opening.

3. The invention of claim 2:
said probe means including a pair of core members, one end of each of said core members extending adjacent the teeth on said axle and the teeth on said housing, respectively.

4. The invention of claim 3:
said probe including a pair of coils, one of said coils circumscribing each of said core members, and magnetic means engaging the base of said core members.

5. The invention of claim 4; and
means connecting the other ends of said core members to present a generally U-shaped structure, said magnetic means including a single magnet abutting the connecting means.

* * * * *